June 3, 1924.
F. WETZEL
TANK
Filed Sept. 7, 1923
1,496,695
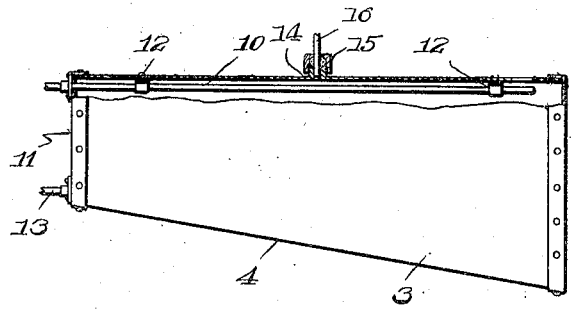
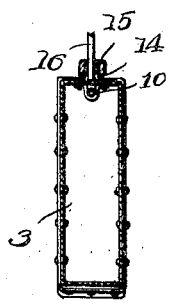
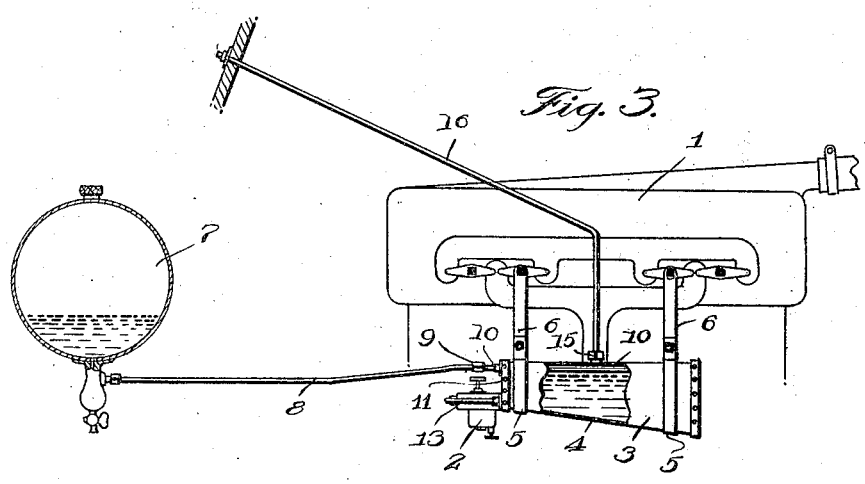
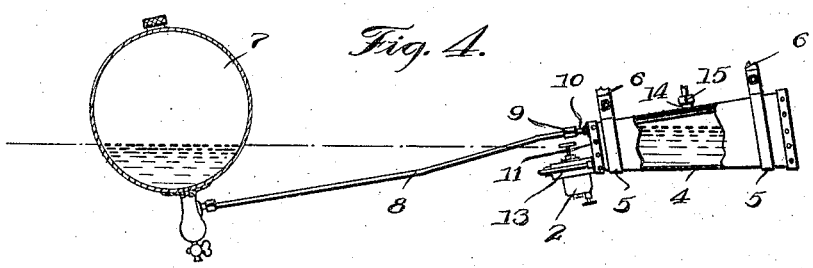
Frank Wetzel
INVENTOR
J. M. Evans
WITNESS:
BY Victor J. Evans
ATTORNEY Patented June 3, 1924.

1,496,695

UNITED STATES PATENT OFFICE.

FRANK WETZEL, OF GOSPORT, INDIANA.

TANK.

Application filed September 7, 1923. Serial No. 661,460.

*To all whom it may concern:*

Be it known that I, FRANK WETZEL, a citizen of the United States, residing at Gosport, in the county of Owen and State of Indiana, have invented new and useful Improvements in Tanks, of which the following is a specification.

The object of this invention is the provision of an auxiliary gasoline tank for carbureters of internal combustion engines employed on automobiles whereby gasoline will be fed into the carbureter when the automobile is climbing steep hills and when the feed pipe between the carbureter and the gasoline supply tank is at such angle that the same will not feed to the carbureter.

A further object is the provision of means for this purpose characterized by simplicity in construction and reliability and efficiency in practical use.

To the attainment of the foregoing, the invention consists in the improvement as herein described and definitely claimed.

In the drawing:—

Figure 1 is a side elevation of an auxiliary gas tank for the carbureters of automobile engines in accordance with this invention.

Figure 2 is a substantially vertical central longitudinal sectional view therethrough.

Figure 3 is a side elevation illustrating the application of the improvement on the engine.

Figure 4 is a diagrammatic view showing the manner in which gasoline is fed from the auxiliary tank into the carbureter when the vehicle is traveling a steep incline.

Referring now to the drawing in detail, the numeral 1 designates a sufficient portion of an internal combustion engine for automobiles to illustrate the application of my improvement. The carbureter for the engine is indicated by the numeral 2.

My improvement comprises a substantially rectangular tank 3 closed throughout, except at parts hereinafter referred to. The tank from the end thereof which is disposed nearest the carbureter 2 has its bottom arranged at a downward angle, as indicated by the numeral 4. Around the tank, adjacent to the ends thereof I secure the looped portions 5 of straps 6. The straps are, of course, of metal and are supported by the bolts that attach the manifold retaining stirrups to the engine.

The gasoline supply tank for the engine 1 is indicated by the numeral 7 and is provided in the usual manner with the supply tank for the carbureter. In the present instance, however, the supply pipe 8 does not lead to the carbureter, but has its end connected by a joint 9 to a pipe 10 that is let in the reduced end 11 of the auxiliary supply tank 3, adjacent to the upper and outer corner thereof. The tube or pipe 10 is suitably supported in the top of the auxiliary tank 3, preferably by brackets 12, and the pipe 10 delivers adjacent to the rear and larger end of the auxiliary tank 3. At its forward end 11, the auxiliary tank has attached to the bottom thereof an outlet pipe 13 that leads directly to the carbureter 2.

The auxiliary tank 3 is centrally provided with an opening that is surrounded by an outstanding threaded boss 14. This boss is engaged by a compression nut 15 which couples thereto an air pipe 16. The air pipe may lead to the dashboard of the automobile. By removing the compression nut 15 the auxiliary tank may be filled through the opening surrounded by the boss 14.

The simplicity of my construction and its advantages will, it is thought, be apparent from the foregoing description to those skilled in the art to which such inventions relate. In all classes of automobiles in which a vacuum feed is not employed, the machine is unable to climb hills when the gasoline in the supply tank is low. With my improvement, the gas from the supply tank is fed directly into the auxiliary tank 3 so that the said tank is always filled. Because of the inclined bottom 4 of the auxiliary tank, all of the gasoline therein will be delivered into the carbureter when the machine is on a steep incline, as disclosed in the diagram shown in Figure 4. Thus, an automobile equipped with my improvement can climb the steepest incline, the auxiliary tank being of such size as to contain sufficient gasoline to assure this purpose. The gasoline in the auxiliary tank, being arranged close to the engine will become heated, and thus the volatility thereof is materially increased.

While I have illustrated a satisfactory embodiment of my improved device, my features of invention are capable of extended application, and I do not wish to be limited to the specific structure shown and described.

Having described the invention, I claim:—

An auxiliary gasoline tank for the carbureter of an automobile engine, comprising a body, means thereon for hanging the same from one side of the engine, said body comprising a substantially rectangular member but having its bottom inclined from its front to its rear, a pipe projecting through the front end of the auxiliary tank and terminating adjacent to the rear end thereof, brackets supporting the pipe from the top of the auxiliary tank, a coupling for connecting said pipe to the outlet pipe of the supply gasoline tank of the automobile, a pipe connection between the front end at the bottom of the auxiliary tank and the carbureter, said auxiliary tank having a filler opening in the top thereof and a boss surrounding the same, a compression nut screwed on the boss, and an air inlet pipe connected with the compression nut and communicating with the auxiliary tank.

In testimony whereof I affix my signature.

FRANK WETZEL.